US010577086B2

(12) United States Patent
Baker, Jr.

(10) Patent No.: US 10,577,086 B2
(45) Date of Patent: Mar. 3, 2020

(54) HIGH EFFICIENCY STALL PROOF AIRFOIL AND MEANS OF CONTROL

(71) Applicant: George Paul Baker, Jr., Denham Springs, LA (US)

(72) Inventor: George Paul Baker, Jr., Denham Springs, LA (US)

(*) Notice: Subject to any disclaimer, the term of this patent is extended or adjusted under 35 U.S.C. 154(b) by 475 days.

(21) Appl. No.: 15/650,861

(22) Filed: Jul. 15, 2017

(65) Prior Publication Data
US 2019/0009890 A1    Jan. 10, 2019

Related U.S. Application Data

(60) Provisional application No. 62/528,614, filed on Jul. 5, 2017.

(51) Int. Cl.
*B64C 21/04*  (2006.01)
*B64C 3/14*   (2006.01)
*B64C 3/38*   (2006.01)
*B64C 29/00*  (2006.01)

(52) U.S. Cl.
CPC .............. *B64C 21/04* (2013.01); *B64C 3/141* (2013.01); *B64C 3/385* (2013.01); *B64C 29/0033* (2013.01); *B64C 2003/143* (2013.01); *B64C 2003/146* (2013.01)

(58) Field of Classification Search
CPC ......... B64C 21/04; B64C 3/385; B64C 3/141; B64C 29/0033; B64C 2003/146; B64C 2003/143
See application file for complete search history.

(56) References Cited

U.S. PATENT DOCUMENTS

| | | | | |
|---|---|---|---|---|
| 4,600,172 A * | 7/1986 | Loth | ...................... | B64C 21/04 244/207 |
| 4,705,240 A * | 11/1987 | Dixon | ..................... | B64C 21/00 244/199.2 |
| 8,087,618 B1 * | 1/2012 | Shmilovich | ............... | B64C 9/38 244/198 |
| 9,108,725 B1 * | 8/2015 | Shmilovich | ............. | B64C 21/04 |
| 2011/0108672 A1 * | 5/2011 | Shmilovich | ............... | B64C 9/18 244/207 |
| 2016/0009364 A1 * | 1/2016 | Goel | ...................... | B64C 3/141 244/206 |
| 2016/0052621 A1 * | 2/2016 | Ireland | .................... | F04D 29/30 137/13 |

* cited by examiner

*Primary Examiner* — Assres H Woldermaryam

(57) ABSTRACT

A high-efficiency, stall-proof airfoil is an aircraft wing configuration whereby a motive force directly induces gaseous fluid flow across a lifting surface of the airfoil without requiring a movement of the wing through an air space. The airfoil is provided with means to control a pitch, a roll and a yaw motion and to control a position and stability of the aircraft. When not undergoing horizontal displacement, it provides highly efficient use of fuel resources, precluding the formation of drag and its incumbent power consumption. Air pressure at a bottom of the wing remains essentially ambient. Therefore, differential pressure between a lower surface of the wing and an upper surface of the wing maintains its maximum possible quantity. Virtually, all of the power consumed is utilized in a production of lift. Additionally, because lift is generated without regard to an angle-of-attack, forward speed, nor a configuration of a leading edge of the wing, the configuration is essentially stall proof.

26 Claims, 17 Drawing Sheets

HIGH EFFICIENCY STALL PROOF AIRFOIL AND MEANS OF CONTROL

FIELD OF THE INVENTION

This invention relates generally to an airfoil. More particularly, the present invention relates to an airfoil comprising a housing, a pressurized fluid source, a pivot feed tube, a pressurized header, a plurality of partitioning bulkheads, a plurality of flow normalizing chambers and a plurality of pressurized fluid escape ports.

BACKGROUND OF THE INVENTION

Airfoils used in the field of aviation fall generally into two categories: fixed-wing, when its application emphasizes horizontal displacement of the aircraft, and rotary-wing when its usage requires more emphasis on vertical displacement. In subsonic flight, both of said categories produce lift generated by the shape of the wing combined with the movement of gaseous fluid over and around the wing. In particular, the leading edge of the wing is shaped to produce a flow of fluid at a higher velocity over the top of the wing when compared to the velocity below the bottom of the wing. Due to the Bernoulli Effect, the pressure sensed at the wing surfaces are reduced, but because the fluid velocity at the top wing surface is greater than that at the lower, a lower pressure will be sensed at the top. This differential pressure represents the lift used to produce flight. Fixed-wing aircraft rely upon forward motion of the aircraft to produce the fluid flow required to generate lift. Rotary-wing aircraft are configured to rotate the wings around a central mast thereby forcing the flow of fluid over and around the wings as they rotate. In both a fixed-wing and a rotary-wing configuration, the motion of the wing through air produces drag, the aerodynamic force that opposes the wings motion through the air. The greater the lift required, the greater the velocity of air required over the wing, and thereby, the greater the drag produced. With powered flight, in both fixed-wing and rotary-wing configurations, drag consumes a significant portion of power generated by the engine.

The lift generated by the flow of fluid over and around the wing depends upon the maintenance of a boundary layer, which in turn is dependent upon the configuration of the leading edge of the wing and by the angle of attack. As the boundary layer separates from the wing, the amount of lift is decreased. This flow separation can be caused by increasing the angle-of-attach, (i.e. the angle of the wing section relative to the direction of flight) or by changes in the geometry of the leading-edge, such as the accumulation of ice on the leading-edge. As the fluid flow approaches complete separation from the wing surface, a stall in induced where insufficient lift is produced to maintain flight. (According to the Federal Aviation Administration of the U.S. Government, loss of control, mainly stalls, account for most General Aviation accidents).

The present invention specifically addresses, in scenarios that emphasize horizontal displacement (i.e. fixed-wing airfoils) and in those that emphasize vertical displacement (i.e. rotary-wing airfoils), the effects of drag and of flow/boundary layer separation, said separation occurring either at high angle of attack and/or because of distortion of the geometry of the leading-edge.

SUMMARY OF THE INVENTION

The instant invention provides for an airfoil configuration wherein the motive force directly induces gaseous fluid flow across the top, lifting surface of the airfoil without requiring the movement of the wing through space, neither forward motion of an aircraft emphasizing horizontal displacement, nor rotation of the wings of a rotary-wing aircraft emphasizing vertical displacement. Furthermore, means of controlling the pitch, roll, yaw, position and stability of the aircraft is provided. Through elimination of the requirement of movement through air, the present invention provides highly efficient use of fuel resources since it precludes the formation of drag and its incumbent power consumption. Also, without forward motion, the air pressure at the bottom of the wing remains essentially ambient, so the differential pressure between the lower wing and the upper wing maintains its maximum possible quantity and virtually all of the power consumed is utilized in the production of lift. Additionally, since lift is generated without regard to the angle-of-attack nor the configuration of the leading-edge, the described embodiments are essentially stall proof.

DETAILED DESCRIPTION OF THE INVENTION

Figure 1:
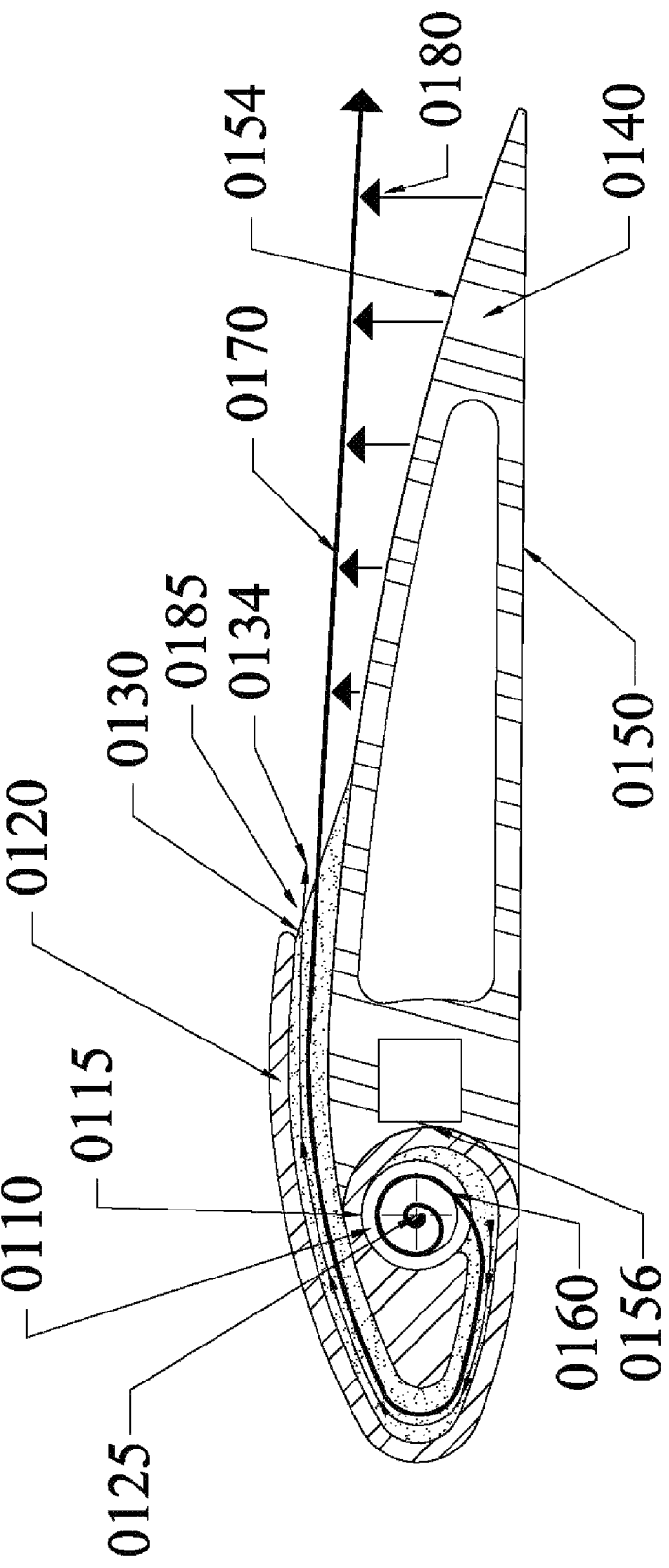
FIG. 1 a cross-section of the fundamental wing configuration.

In the following paragraphs, the present invention will be described in detail by way of example with reference to the attached drawings. Throughout this description, preferred embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The first embodiment presented will be that of a quasi-rectangular, fixed-wing type airfoil used in aircraft applications which emphasize horizontal displacement. FIG. 1, FIG. 2, FIG. 3, FIG. 4 and FIG. 5 each present a unique view of the structure of a fundamental embodiment of said quasi-rectangular, fixed-wing type airfoil, and will be now discussed concurrently. In examples of the present disclosure, an airfoil (0500) comprises a housing (0580), a pressurized fluid source (0460), a pivot feed tube (0110), a pressurized header (0115), a plurality of partitioning bulkheads (0130), a plurality of flow normalizing chambers (0134) and a plurality of pressurized fluid escape ports (0185). The airfoil (0500) has a leading edge (0592), a trailing edge (0594), a root edge (0596) and a distal edge (0598). The housing (0580) has an upper panel (0582), a lifting surface panel (0584), a lower panel (0586), a first side panel (0588) and a second side panel (0590). The lifting surface panel (0584) having a lifting surface (0154). The first side panel (0588) is near the root edge (0596). The second side panel (0590) is near the distal edge (0598). The pivot feed tube (0110) is to rotate about a first axis. The first axis is aligned with a centerline (0125) of the pivot feed tube (0110). The first axis is closer to the leading edge (0592) than the trailing edge (0594). The plurality of pressurized fluid escape ports (0185) are positioned between the upper panel (0582) and the lifting surface panel (0584). The plurality of pressurized fluid escape ports (0185) are aligned along a first direction parallel to the first axis. Pressurized fluid from the pressurized fluid source (0460) passes through the pivot feed tube (0110), passes through the pressurized header (0115), and is periodically interrupted and diverted by the plurality of partitioning bulkheads (0130). A respective portion of the pressurized fluid periodically interrupted and diverted by each of the plurality of partitioning bulkheads (0130) passes through a respective flow normalizing chambers of the plurality of flow normalizing chambers (0134), and then exits a respective pressurized fluid escape port of the plurality of pressurized fluid escape ports (0185) forming a respective portion of a gaseous fluid flow. Motive power of the airfoil directly induces the gaseous fluid flow across the lifting surface (0154) without requiring a movement of the airfoil through an airspace.

Figure 2:
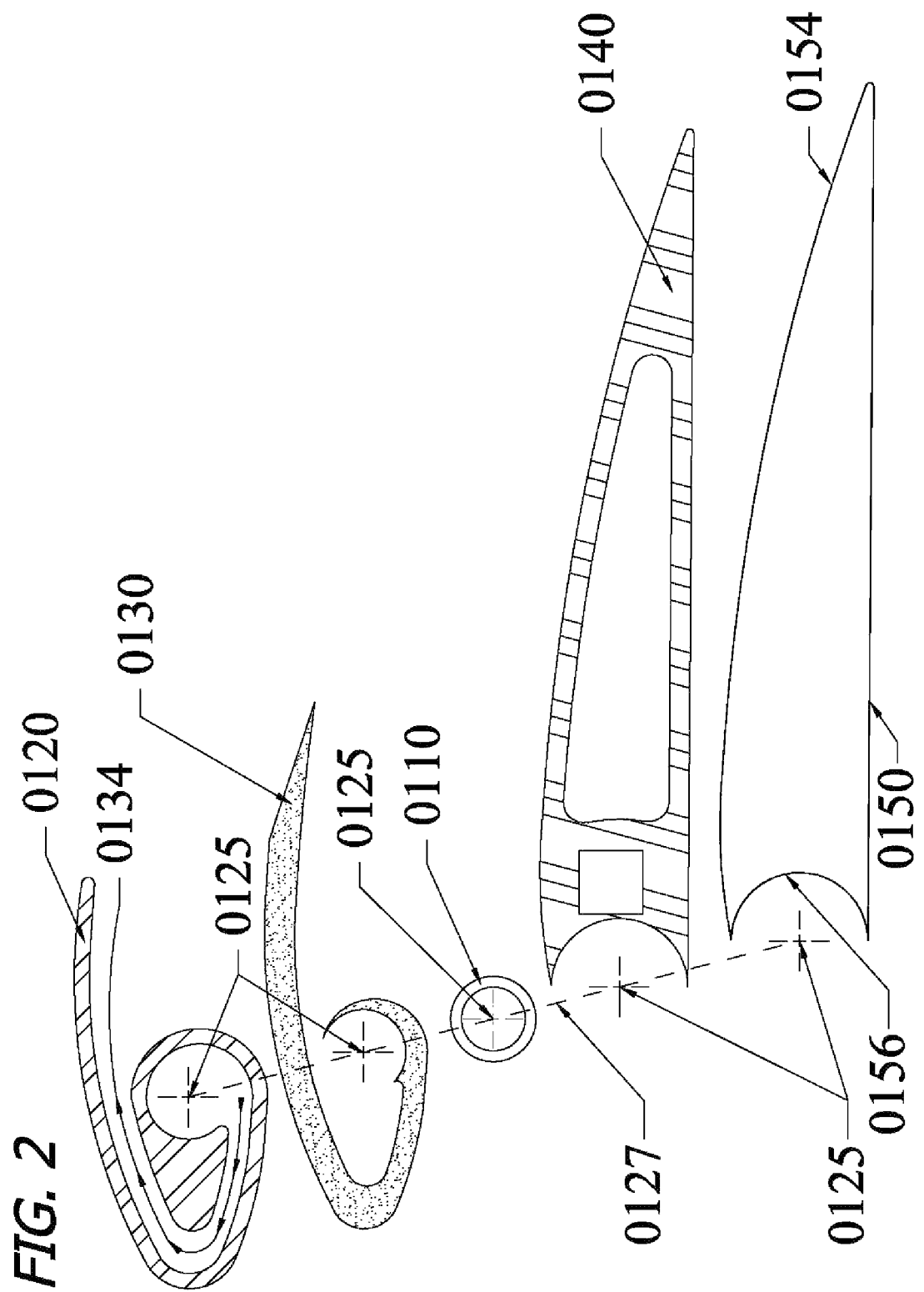
FIG. 2 An exploded cross-section of the fundamental wing configuration.
Figure 3:
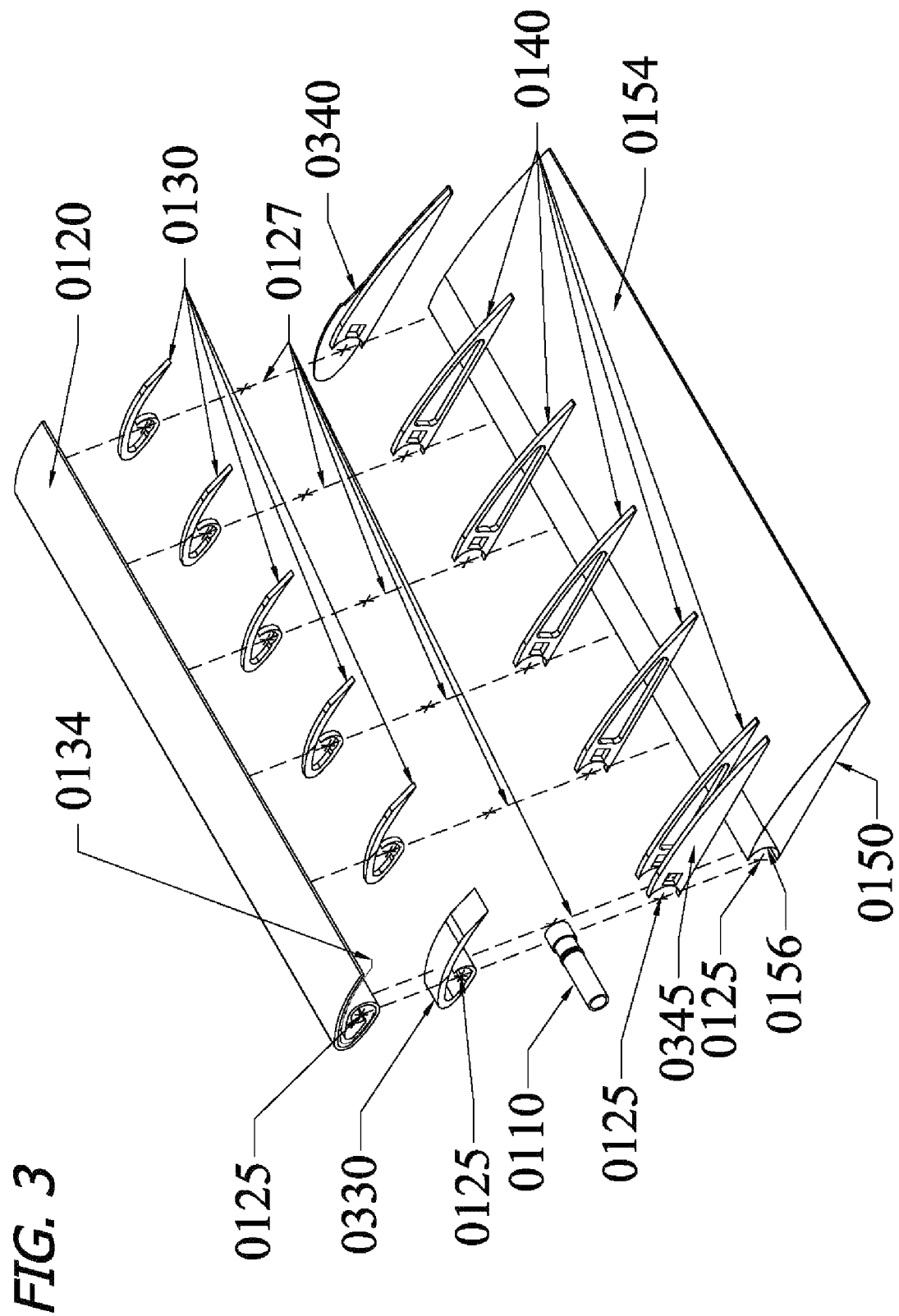
FIG. 3 An exploded isometric of the fundamental wing configuration.

The various components illustrated in FIG. 1, FIG. 2 and FIG. 3 are all arranged about a centerline (0125) of the pivot feed tube (0110). In one example, a pressurized header (0115) is of a helical shape. Said pressurized header (0115) comprises various other components when assembled together and are not noted in the exploded views of FIG. 2 & FIG. 3, where the centering line of various component centerlines (0127) is shown to assist the viewer in understanding how the various components would be fitted together.

The quasi-rectangular, fixed-wing type airfoil embodiment comprises pivot feed tube (0110) providing a compressed fluid to a pressurized header (0115), said pressurized header (0115) being formed by the cooperating elements of a rib enclosing skin (0150) encasing multiple ribs (0140), attached to multiple partitioning bulkheads (0130) which define a series of flow normalizing chambers (0134) contained within a leading edge spar (0120). To provide for enhanced structural strength, said partitioning bulkheads (0130) can be arranged to align with the airfoil ribs (0140), but said alignment is not required for the effective operation of the present invention.

Said rib enclosing skin (0150) entirely encloses the multiple ribs (0140), the top of which forms the lifting surface (0154), and the front of which forms the chamber completion skin (0156), which, cooperating with said leading edge spar (0120) and the partitioning bulkheads (0130) form the flow normalizing chambers (0134).

Said pressurized header (0115) is provided with compressed or expanding, gaseous or vaporous fluid by a pressurized fluid source (0460), (see FIG. 4), which may be generated by any of a variety of technologies.

Passing through the pivot feed tube (0110), said pressurized fluid moves through the pressurized header (0115) along the centerline (0127) of said pressurized header, said fluid flow being periodically interrupted by a partitioning bulkhead (0130) which diverts a portion of the fluid flow into a flow normalizing chamber (0134) at 90°, that is 'normal', to the flow along the centerline (0127), said flow normalizing chamber (0134) directing the flow around and over the pressurized header (0115) to the pressurized fluid escape port (0185) where it exits along the fluid flow escape path (0170) across the lifting surface (0154).

The flow normalizing chamber at the root of said airfoil is sealed by the widened, structural partitioning bulkhead (0330). The Flow normalizing chamber (0134) at the tip of said airfoil is sealed by the solid rib endcap (0340), which also isolates the interstitial space between the ribs (0140) at the wingtip from the exterior. The interstitial space between the ribs (0140) at the root of the airfoil is isolated from the exterior by the solid wing root rib (0345).

Said flow along said fluid flow escape path (0170), near said lifting surface (0154), reduces the pressure sensed at said lifting surface (0154) due to the Bernoulli effect creating induced lift vectors (0180) which operate near said lifting surface (0154).

Figure 4:
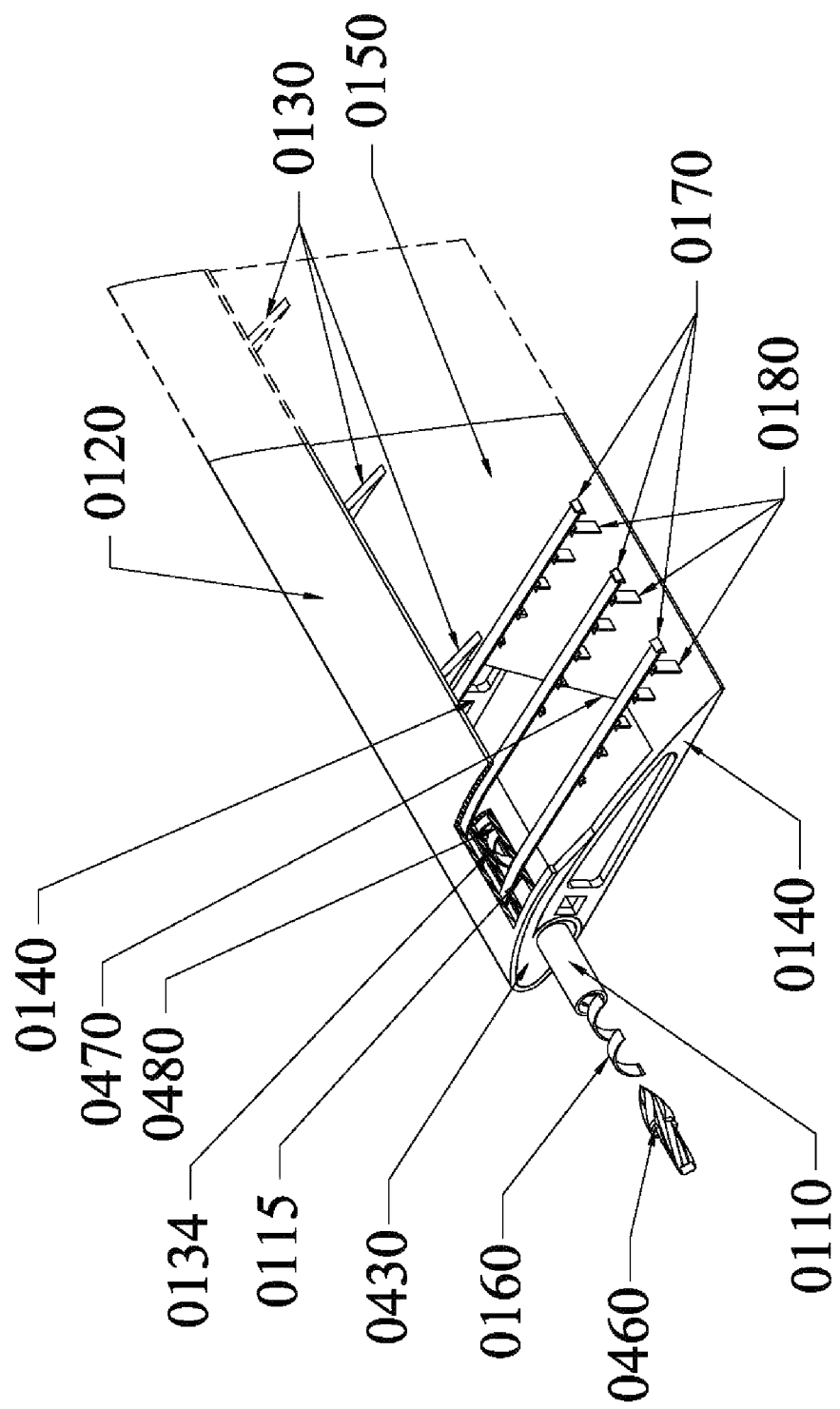
FIG. 4 a cutaway view of the fundamental wing assembly.

FIG. 4 is an illustration of said quasi-rectangular, fixed-wing type airfoil showing a lifting surface skin cutaway (0470) and a chamber completion skin cutaway (0480), wherein a pressurized fluid source (0460) generates a pressurized fluid feed (0160) through the pivot feed tube (0110) into the pressurized header (0115). As the pressurized fluid feed (0160) moves through the pressurized header (0115), a portion of the flow is diverted by the first partitioning bulkhead (0130) into the initial flow normalizing chamber (0134), where said flow moves down, around and through said flow normalizing chamber until it exits under the upper lip of the leading edge spar (0120) through the pressurized fluid escape port (0185), and moving along the fluid flow escape path (0170), near the lifting surface (0154) portion of the rib enclosing skin (0150), said fluid flow creating the induced lift vectors (0180) that are the lifting forces.

Figure 5:
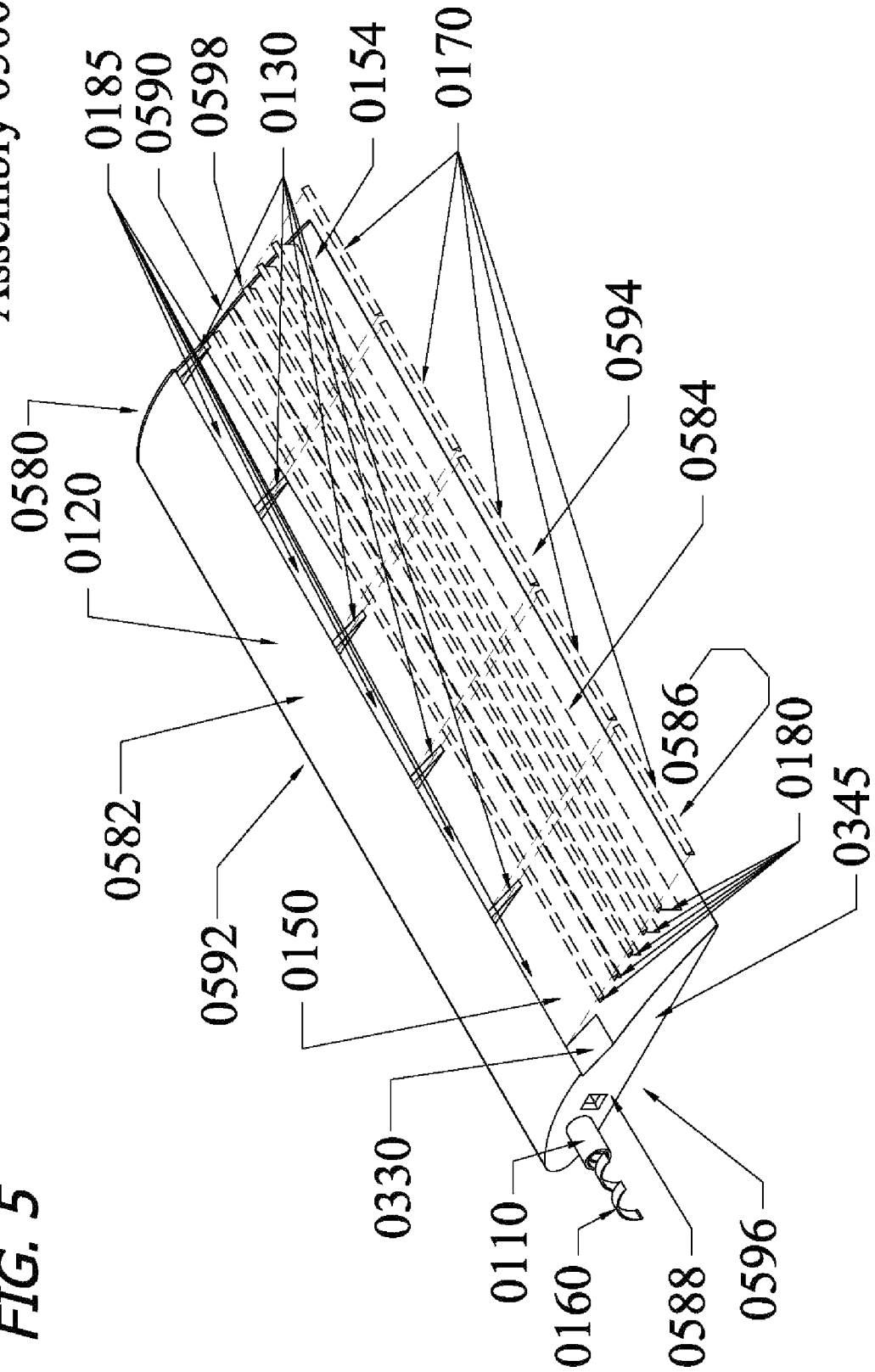
FIG. 5 An isometric view of the fundamental wing assembly illustrating the forced fluid flow over the top lifting surface, and the resulting lift.

FIG. 5 is an illustration of a right-hand quasi-rectangular, fixed-wing type airfoil (Assembly 0500) showing said pivot feed tube (0110) injecting said pressurized fluid feed (0160) into said chambers formed in part by said leading edge spar (0120) and said partitioning bulkheads (0130) wherein the fluid flow is directed through the pressurized fluid escape ports (0185) to follow said fluid flow escape paths (0170), said flow being near [for example, within a range from 0% to 3% of a length of the airfoil assembly (0500) so as to be efficient to provide induced lift vectors (0180)] and parallel to the lifting surface (0154), produces the induced lift vectors (0180) across the quasi-rectangular, fixed-wing type airfoil assembly (0500), said lift vectors (0180), in one example, being normal to (i.e. at 90°) the lifting surface (0154). In another example, an angle between said lift vectors (0180) and the lifting surface (0154) is in a range from 70° to 110°.

Figure 6:
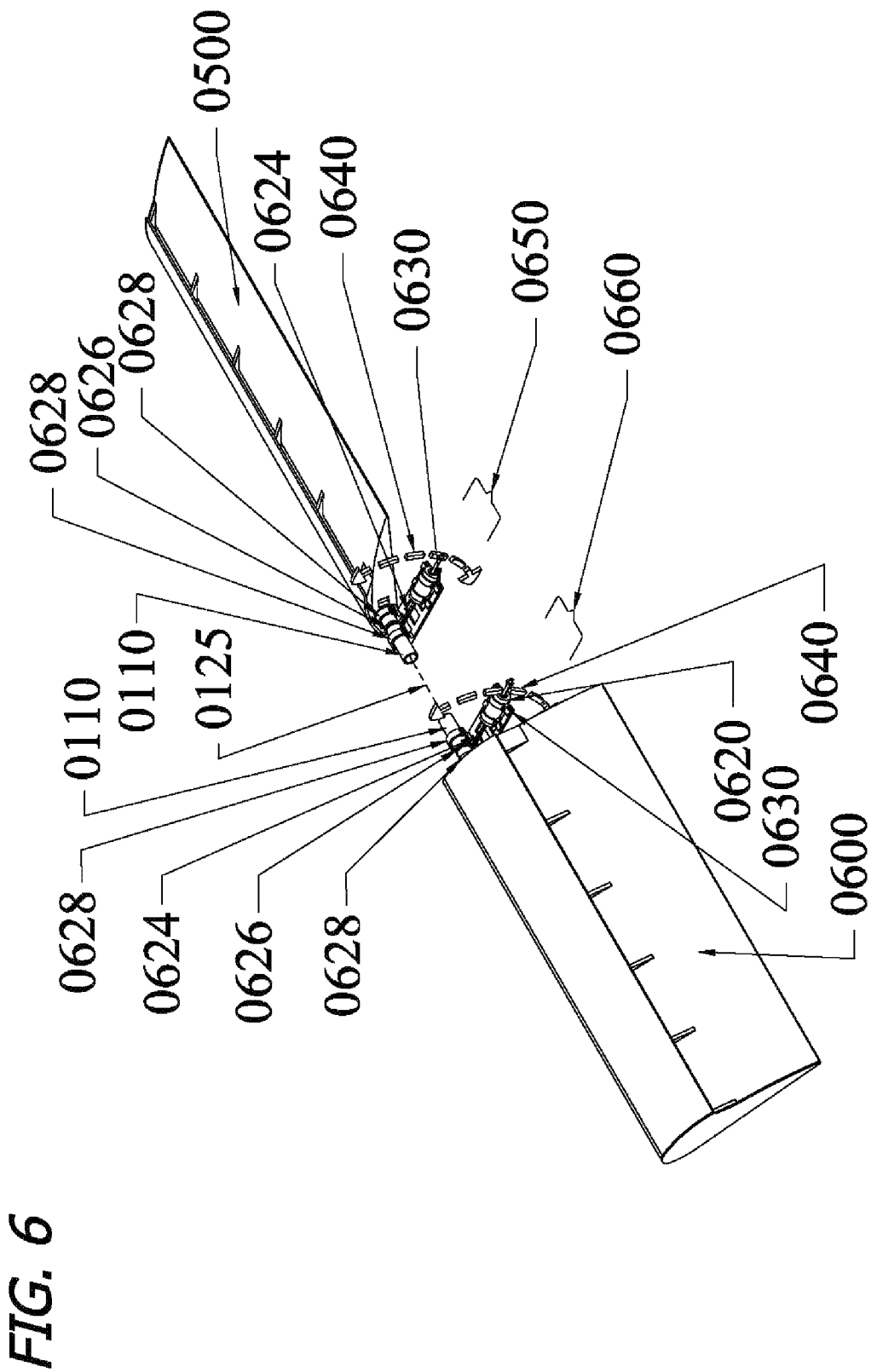
FIG. 6 An isometric view of a plesio-rectangular, full wing assembly showing the input pivot tubes with hydraulic drive mechanisms for individually controlling the pitch of each wing.

FIG. 6 shows said right-hand quasi-rectangular, fixed-wing type airfoil assembly (0500) with its counterpart left-hand quasi-rectangular fixed-wing type airfoil (0600) comprising a mirror image of assembly 0500. Each of said airfoil assemblies (0500 & 0600) is mounted to, and cooperates with a right & left airfoil pitch rotation drive assembly (0650 & 0660), comprised in this embodiment of a hydraulic airfoil rotation drive cylinder (0620), operating an airfoil rotation drive rack gear (0624), said airfoil rotation drive rack gear (0624) engaging an airfoil rotation driver gear (0626), said airfoil rotation driver gear (0626) rigidly fixed to its corresponding pivot feed tube (0110). Each of said pivot feed tube (0110) is rigidly attached to its quasi-rectangular fixed-wing type airfoil (0500 & 0600), such that rotation of the pivot feed tube (0110) by the airfoil rotation driver gear (0626) produces an equal corresponding rotation of said quasi-rectangular fixed-wing type airfoil (0500 & 0600). Said Pivot Feed Tubes (0110) are fixed in place by airfoil rotation bearings (0628), said airfoil rotation bearings are in turned mounted onto an airfoil rotation drive assembly mounting frame (0630) such that the quasi-rectangular, fixed-wing type airfoil assembly (0500 & 0600) is only free to rotate about its pivot point centerline (0125), relative to the airfoil rotation drive assembly mounting frame (0630). In this embodiment, the airfoil pitch rotation drive assemblies (0650 & 0660) are designed to allow each quasi-rectangular fixed-wing type airfoil (0500 & 0600) to rotate through airfoil rotation range (0640) of +30° to −60° above and below neutral pitch of the airfoil.

Figure 7:
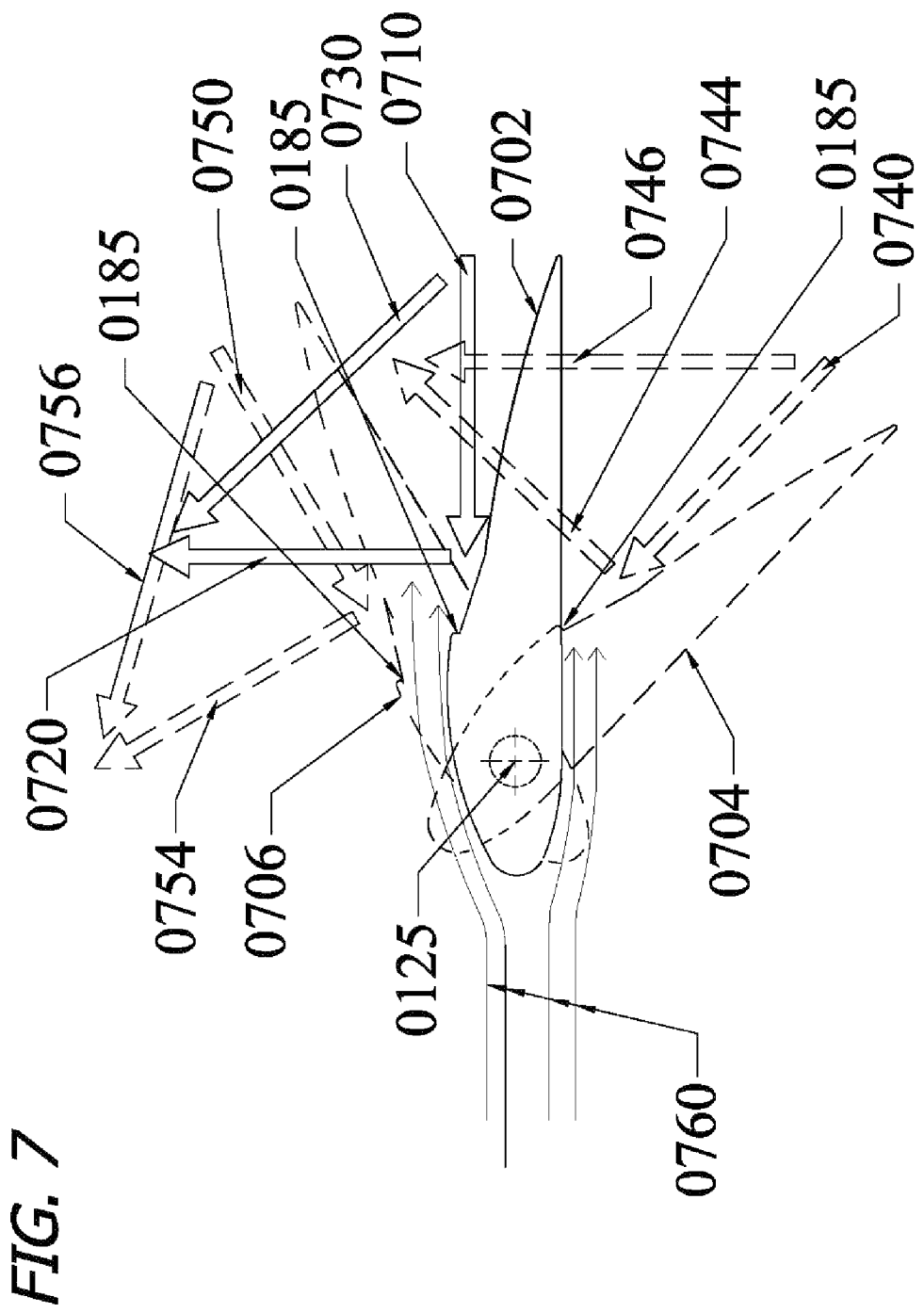
FIG. 7 a side view of the root edge of a wing, showing the various force vectors interacting with the wing, and flow arrows of air movement when the aircraft is in forward motion.

FIG. 7 is a conceptual side view of said quasi-rectangular, fixed-wing type airfoil (0500 or 0600), showing the force vectors will be generated at 0° pitch, at +30° pitch and at −60° pitch about said pivot point centerline (0125). At 0° pitch, the flow of fluid from the pressurized fluid escape port (0185) will generate two force vectors: a thrust vector reaction (710), and a vector summation of the induced lift vectors (720). These said force vectors will combine to produce a resultant vector sum (0730), said resultant vector sum (0730) at a null angle of attack (0° pitch) will force the airfoil forward horizontally and upwards vertically. However, by rotating the assembly to a positive pitch (0704) the thrust vector (0740) and the lift vector (0744) can combine to produce a resultant vector (0746) that has only a vertical component. In this configuration, sufficient lift can be generated to move the aircraft vertically without requiring forward motion, nor with the fluid stream flow lines (0760) that would be produced by the forward motion.

While in forward motion, said quasi-rectangular, fixed wing type airfoils (0500 & 0600) will continue to produce said resultant vectors (0730, 0746 or 0756), which will combine with any lift generated by the fluid stream flow lines (0760). In order to maintain vertical stability of the aircraft, it may be necessary to rotate said quasi-rectangular, fixed-wing type airfoils (0500 & 0600) into a negative pitch so that less lift and more thrust is produced.

The resultant vectors (0730, 0746 & 0756) of FIG. 7, viewed with regard to the differential rotations of wing assemblies 0500 & 0600 illustrated in FIG. 6, show how said differential pitch can be utilized to control and maintain the roll orientation of the aircraft.

Figure 8:
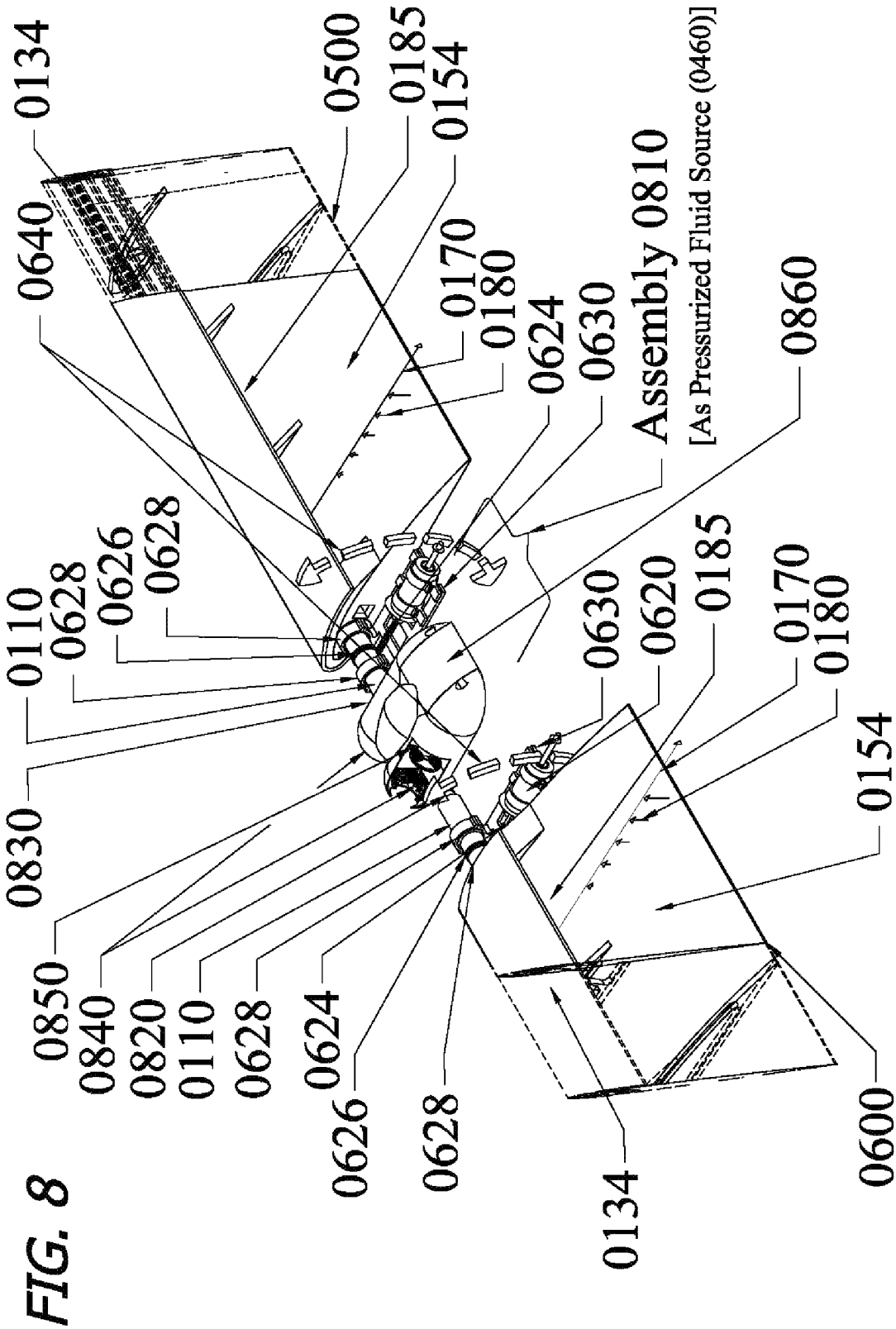
FIG. 8 An isometric view of the wing assembly with air flow being driven by powered turbine blowers.

FIG. 8 illustrates said airfoil assemblies 0500 & 0600 wherein said pressurized fluid source (0460) is created and maintained by counter-rotating, engine driven turbine compressors (0810). Within said turbine blower drive assembly, a compartmented internal combustion engine (0860) powers a turbine blower drive gear system (0850), which in turn rotate counter-rotating turbine blowers (0840). Said counter-rotating turbine blowers (0840) compress air from the atmosphere and by means of a left turbine blower exhaust duct (0820) delivers pressurized fluid to the pivot feed tube (0110) of the left-hand quasi-rectangular fixed-wing type airfoil (0600), and by means of a right turbine blower exhaust duct (0830), delivers pressurized fluid to the pivot feed tube (0110) of the right-hand quasi-rectangular fixed-wing type airfoil (0500). As this pressurized fluid source (0460) propagates through the flow normalizing chambers (0134) of each airfoil assembly (0500 & 0600), exiting via the pressurized fluid escape ports (0185), the fluid flow escape path (0170), flowing near the lifting surface (0154), generates the induced lift vectors (0180).

Figure 9:
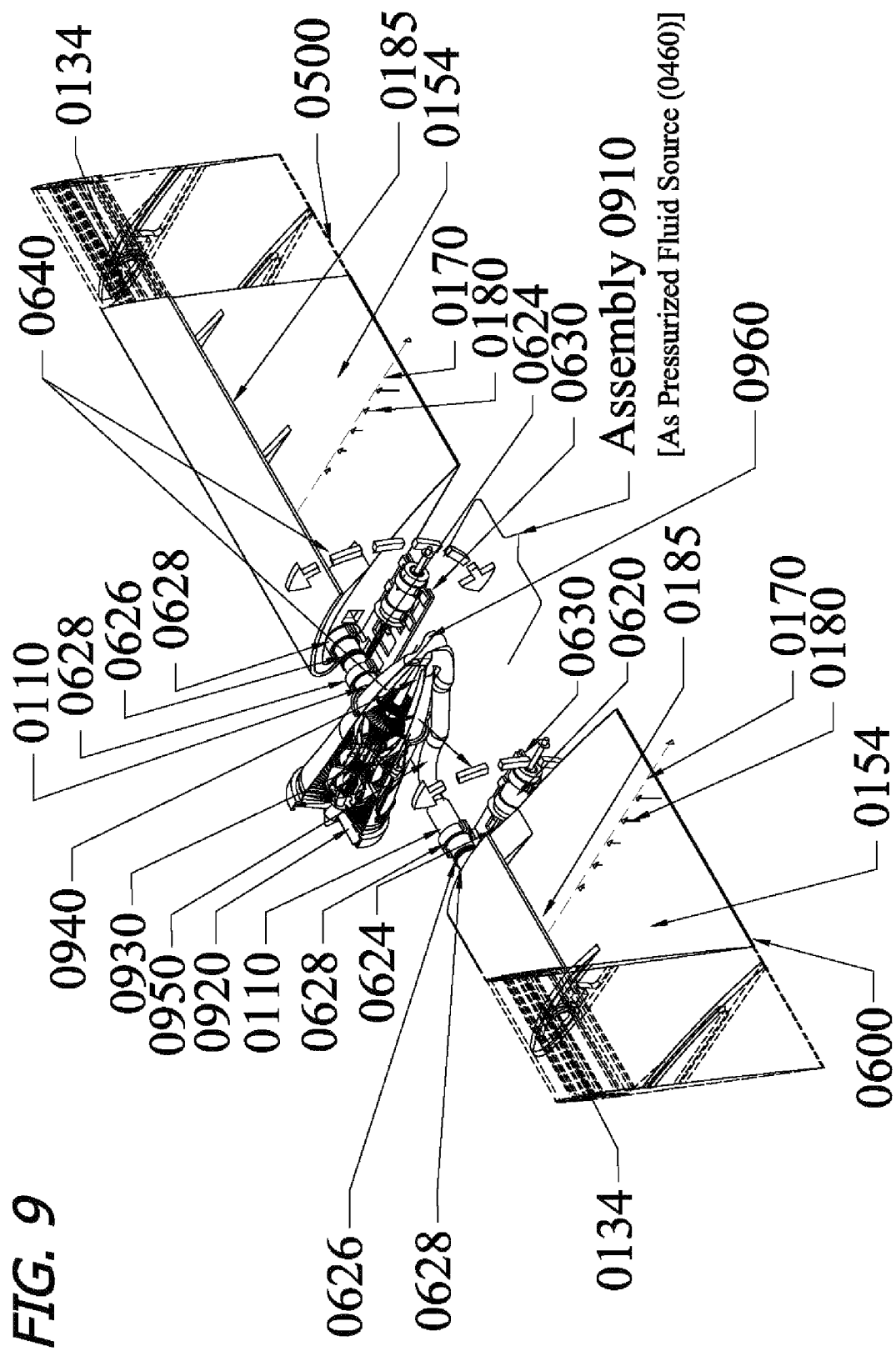
FIG. 9 An isometric view of a wing assembly powered by a Fan-Jet Engine with the motive fluid comprising the exhaust gases exhausting from the engine, combined with intake air driven by the Fan.

FIG. 9 illustrates said airfoil assemblies 0500 & 0600 wherein said pressurized fluid source (0460) is created and maintained by a fan-jet drive assembly (0910). Within said fan-jet drive assembly (0910), a turbojet assembly (0930) generates thrust via the jet exhaust and directly drives a bypass fan assembly (0920). Said bypass fan assembly compresses air from the atmosphere which combines with the jet exhaust of said turbojet assembly (0930) to produce an augmented, cooled and acoustically dampened source of pressurized fluid at the combined exhaust manifold (0940), which segregates the exhaust flow into two equal streams to feed the left fan-Jet exhaust duct (0950) and the right fan-jet exhaust duct (0960). In turn, said left fan-jet exhaust duct (0950) delivers pressurized fluid to the pivot feed tube (0110) of the left-hand quasi-rectangular fixed-wing type airfoil (0600), and the right fan-jet exhaust duct delivers pressurized fluid to the pivot feed tube (0110) of the right-hand quasi-rectangular fixed-wing type airfoil (0500). As said pressurized fluid source (0460) propagates through the flow normalizing chambers (0134) of each airfoil assembly (0500 & 0600), exiting via the pressurized fluid escape ports (0185), the fluid flow escape path (0170), flowing near the lifting surface (0154), generates the induces lift vectors (0180).

Figure 10:
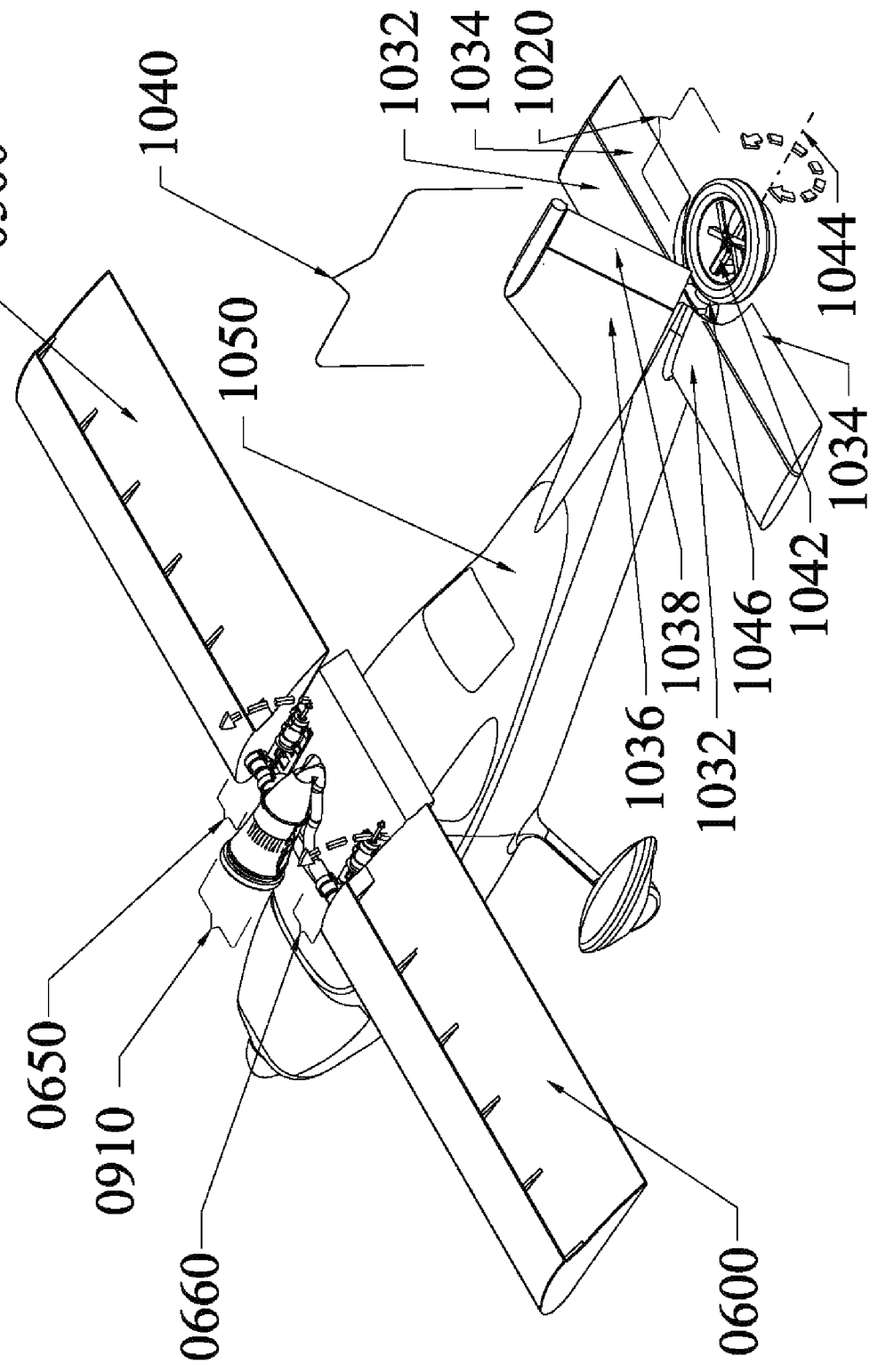
FIG. 10 An isometric view of a fixed-wing aircraft incorporating a Fan-Jet driven embodiment of the instant invention, the wing pitch driving hydraulic mechanisms and an aircraft pitch, yaw and position control tail rotor.

FIG. 10 shows a complete aircraft assembly (1000) comprises left & right-hand quasi-rectangular fixed-wing type airfoil assemblies (0500 & 0600), an aircraft fuselage (1050) and an empennage assembly (1040) with subcomponents for yaw & pitch control while stationary (i.e. No forward motion) & while translating horizontally relative to the surface of the earth. For yaw & pitch control while stationary, said empennage assembly (1040) is comprised of a tail rotor assembly (1020), which in turn is comprised of a variable pitch & speed rotor (1042) and a rotor drive & rotation control assembly (1046). Said rotor drive & rotation control assembly (1046) has linkages and mechanisms to fix and maintain the amount of power being delivered to the pitch & speed rotor (1042), the pitch of the blades of said variable pitch & speed rotor (1042), and the rotation of the tail rotor (1020) about the longitudinal axis (1044). Through manipulations of the amount of power being delivered to the tail rotor (1020), the instantaneous pitch of the rotor (1042), and the rotation of the tail rotor (1020) about the longitudinal axis (1044), said tail rotor drive & control assembly is able to fix and maintain the yaw and pitch of the aircraft fuselage (1050) relative to the surface of the earth. Once forward motion is established and sufficient air velocity is maintained across control surfaces, other components of said empennage assembly (1040), specifically a horizontal stabilizer (1032), an elevator (1034), a vertical stabilizer (1036) and a rudder (1038), would then provide control of the yaw and pitch of the aircraft fuselage (1050), and power to the tail rotor (1020) may be curtailed. The power and positional commands for the empennage assembly (1040), that is, for the control surfaces (elevator 1034, rudder 1038), the power input to the tail rotor (1020), the pitch of the rotor (1042) and the rotation of the tail rotor (1020) about the longitudinal axis (1044), could be provided by any conventional means such as cable & pulley systems, direct mechanical linkages, etc. In this embodiment, a fly-by-wire hydraulically controlled system will be illustrated through which pilot commands are interpreted by a computerized control system to provide specific adjustments to the aircraft flight control power sources, surfaces and assemblies.

Figure 11:
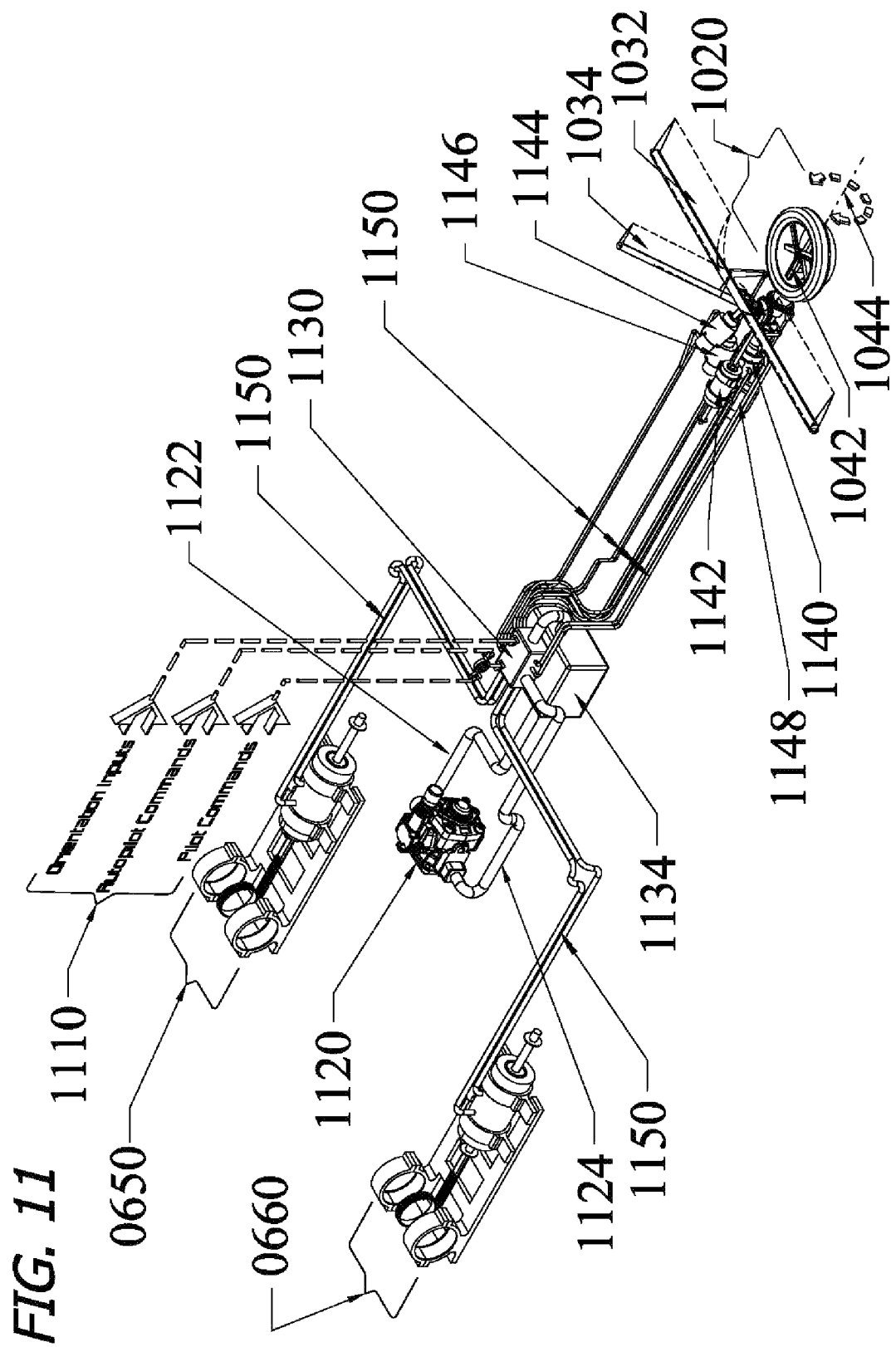
FIG. 11 A schematic diagram representation of a fly-by-wire, processor controlled, hydraulic control system for the fixed-wing embodiment of the present invention.

FIG. 11 illustrates a computerized hydraulic command & control system for said aircraft assembly (1000) comprising a hydraulic pump (1120), a hydraulic fluid reservoir (1134), hydraulic fluid distribution header from the pump discharge (1124), source and return hydraulic tubing (1150), hydraulic fluid return header to the hydraulic pump (1120), a flight control computer & hydraulic control assembly (1130) with its control system command inputs (1110), a tail rotor speed drive motor (1140) providing power to said pitch & speed rotor (1042) and linear motion hydraulic cylinders: an elevator drive cylinder (1142) to drive said forward motion elevator (1034), a rudder drive cylinder (1144) to drive said rudder (1038), a rotor blade pitch control cylinder (1146) to set and maintain said rotor (1042), and a tail rotor rotation control cylinder (1148) to fix and maintain the rotation of said tail rotor (1020) about its longitudinal axis (1044). Said flight control computer (part of flight control computer & hydraulic control assembly 1130) takes as input the control system command inputs (1110) and compares them to internal sensors of instantaneous aircraft position, orientation and velocities (part of flight control computer & hydraulic control assembly 1130) and generates actions for the hydraulic fluid control system (part of flight control computer & hydraulic control assembly 1130) to fix and maintain power to and/or positions of the various hydraulic motors and cylinders (1140, 1142, 1144, 1146, 1148).

Figure 12:
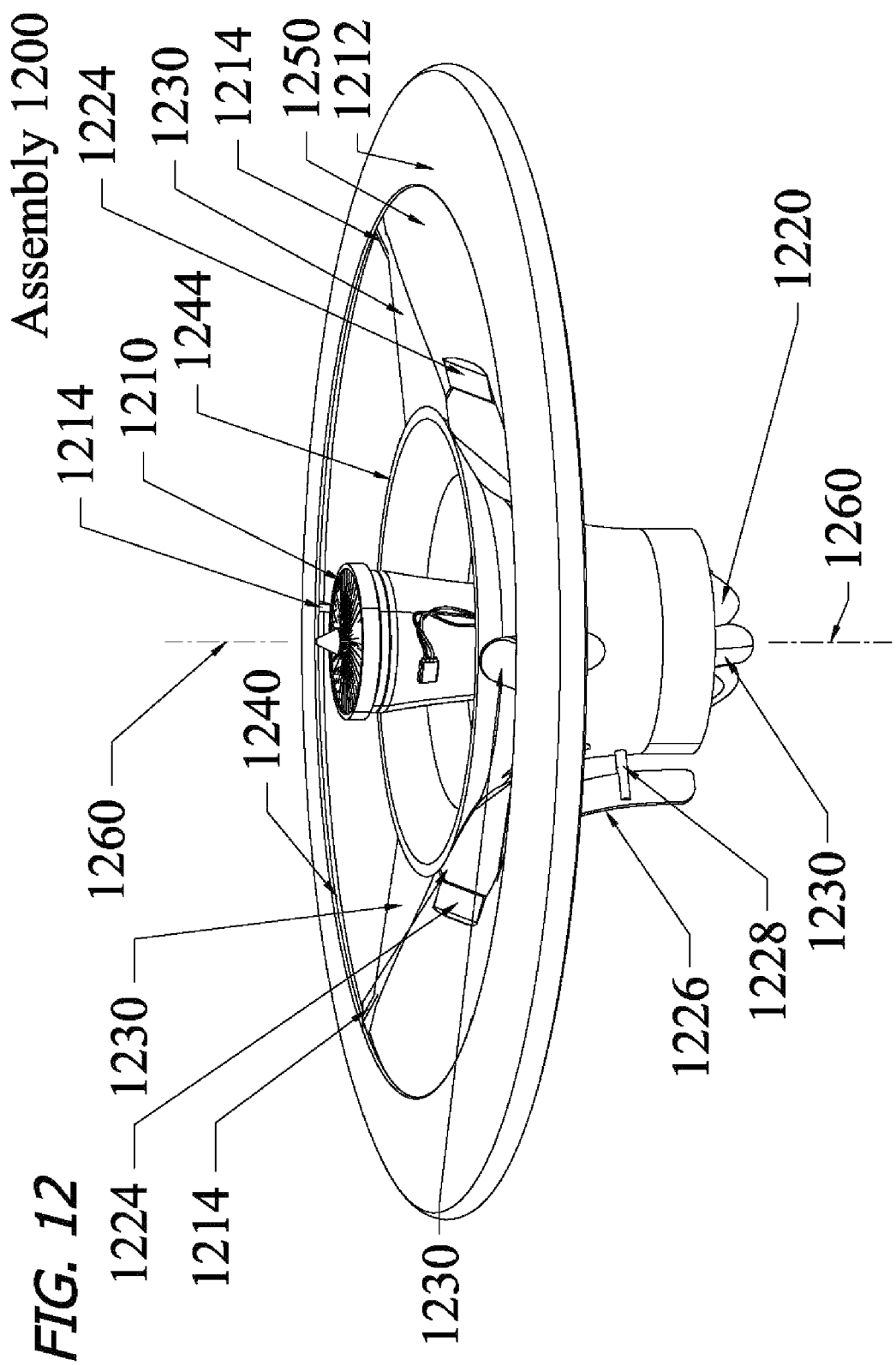
FIG. 12 a perspective view of the toroidal configuration of the embodiment of the wing assembly particularly suited to vertical displacement, driven by a Fan-Jet engine with triplex feed manifolds.
Figure 13:
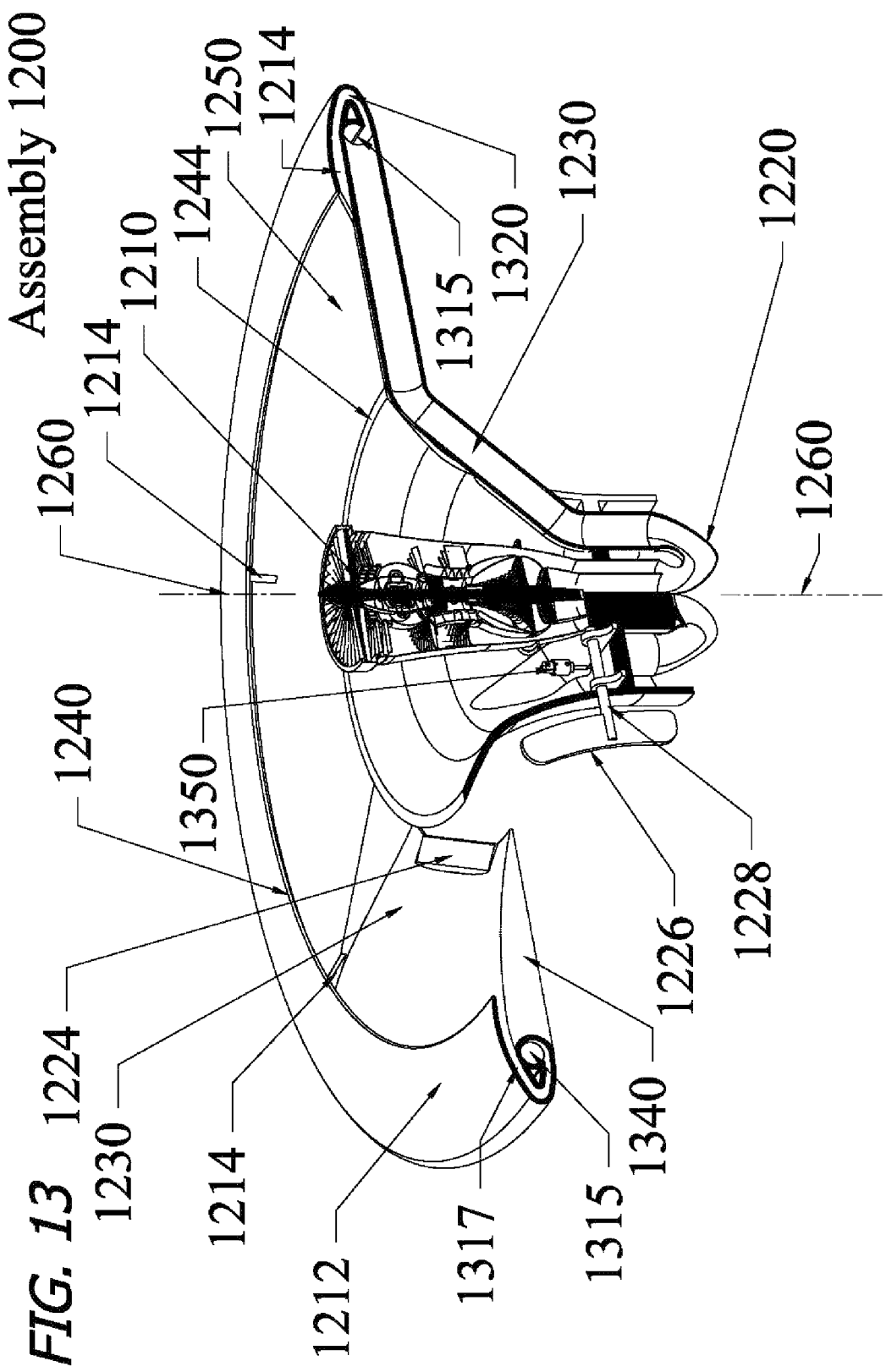
FIG. 13 an isometric, cross-sectional view of the toroidal embodiment particularly adapted for vertical displacement.

In another embodiment illustrated in FIG. 12 and FIG. 13, elements of the cross-section of FIG. 1, i.e. said pressurized header (0115), said leading edge spar (0120), said rib enclosing skin (0150) with its lifting surface (0154), are mathematically revolved about a central revolution axis (1260) to form a flattened toroidal type airfoil assembly (1200). In this embodiment, a fan-jet drive engine assembly (1210) generates pressurized fluid in the fan-jet exhaust header (1220) which distributes portions of the pressurized fluid flow to each of three pressurized feed ducts (1230). Said pressurized feed ducts (1230) direct the pressurized fluid into a continuous toroidal pressurized header (1315). Rotationally formed versions of partitioning bulkheads (1214) are distributed about a toroidal leading edge spar (1212) with a helical chamber to form toroidal flow normalizing chambers (1317). Said partitioning bulkheads (1214) divert a portion of the pressurized fluid flow into each toroidal flow normalizing chamber (1317) where said flow is redirected at 90° into a helical chamber (1320) to be discharged through a pressurized fluid escape port (1240) forcing the flow stream towards the center for the flattened toroidal airfoil assembly (1200) and across the a lifting surface (1250) formed around a system of toroidal airfoil ribs (1340), creating lift. Subsequent to traversing across the lifting surface (1250) the flowing fluid impinges upon a discharge deflection shroud (1244) and is deflected downward providing additional lift to the airfoil assembly (1200).

As also shown in FIG. 12 and FIG. 13, the horizontal position and stability of the flattened toroidal airfoil assembly (1200) is fixed and maintained by a number of ailerons (1224) installed in the discharge edge of the lifting surface (1250) adjacent to the discharge deflection shroud (1244). By differential manipulation of said ailerons (1224), the roll, pitch & yaw of the airfoil assembly (1200) can be set and controlled. Additionally, the rotation of the airfoil assembly (1200) can be set and maintained by a rotation control fin (1226) set into the fluid flow stream exiting downward from the discharge deflection shroud (1244). Said rotation control fin (1226) can be rotated about the axis of a rotation control fin drive shaft (1228) as controlled by a rotation control fin drive cylinder (1350). As said rotation control fin (1226) revolves about its axis, the leading and trailing edges of said rotation control fin (1226) impinges into the fluid flow deflecting off of said discharge deflection shroud (1244), creating a force vector at 90° to and offset from said toroidal airfoil revolution axis (1260) causing the flattened toroidal airfoil assembly (1200) to rotate about said revolution axis (1260) in a direction corresponding to said rotation control fin's (1226) positive or negative rotation about said rotation control fin drive shaft (1228) away from its neutral position.

Figure 14:
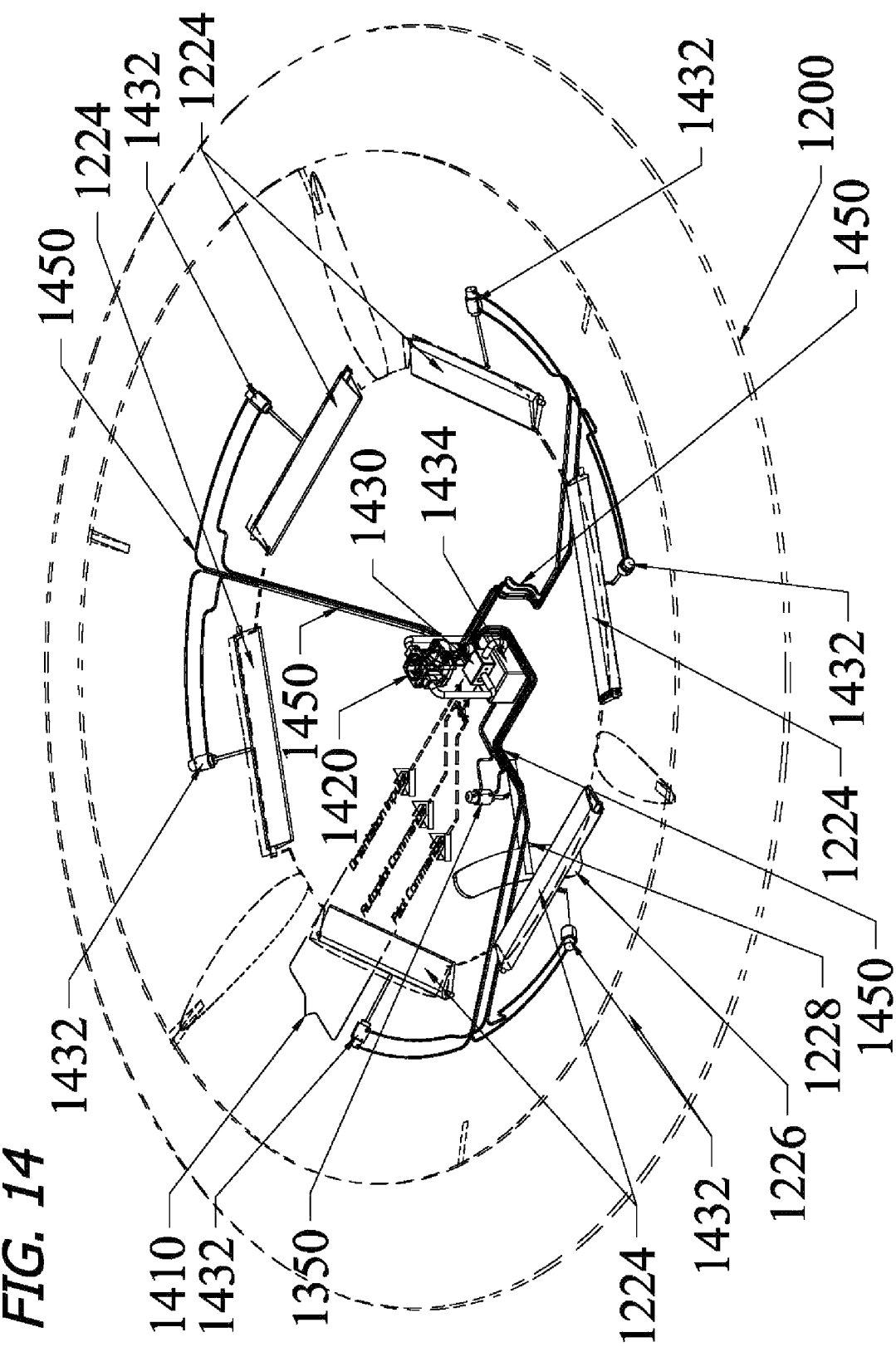
FIG. 14 A schematic diagram representation of a fly-by-wire, processor controlled, hydraulic control system for the toroidal configuration.

FIG. 14 illustrates a computerized hydraulic command & control system for said flattened toroidal airfoil assembly (1200) comprising a hydraulic pump (1420), a hydraulic fluid reservoir (1434), source and return hydraulic tubing (1450), a flight control computer & hydraulic control assembly (1430) with its control system command inputs (1410), said rotation control fin drive cylinder (1350) and several aileron drive cylinders (1432). To set and maintain horizontal stability and rotational orientation of said flattened toroidal airfoil assembly (1200) (orientation inputs, autopilot commands & pilot commands), said flight control computer (part of flight control computer & hydraulic control assembly (1430) takes as input the control system command inputs (1410) and compares them to internal sensors of instantaneous aircraft position, orientation and velocities (part of flight control computer & hydraulic control assembly 1430) and generates actions for the hydraulic fluid control system (part of flight control computer & hydraulic control assembly 1430) to fix and maintain the positions of said hydraulic cylinders (1350 & 1432).

Figure 15:
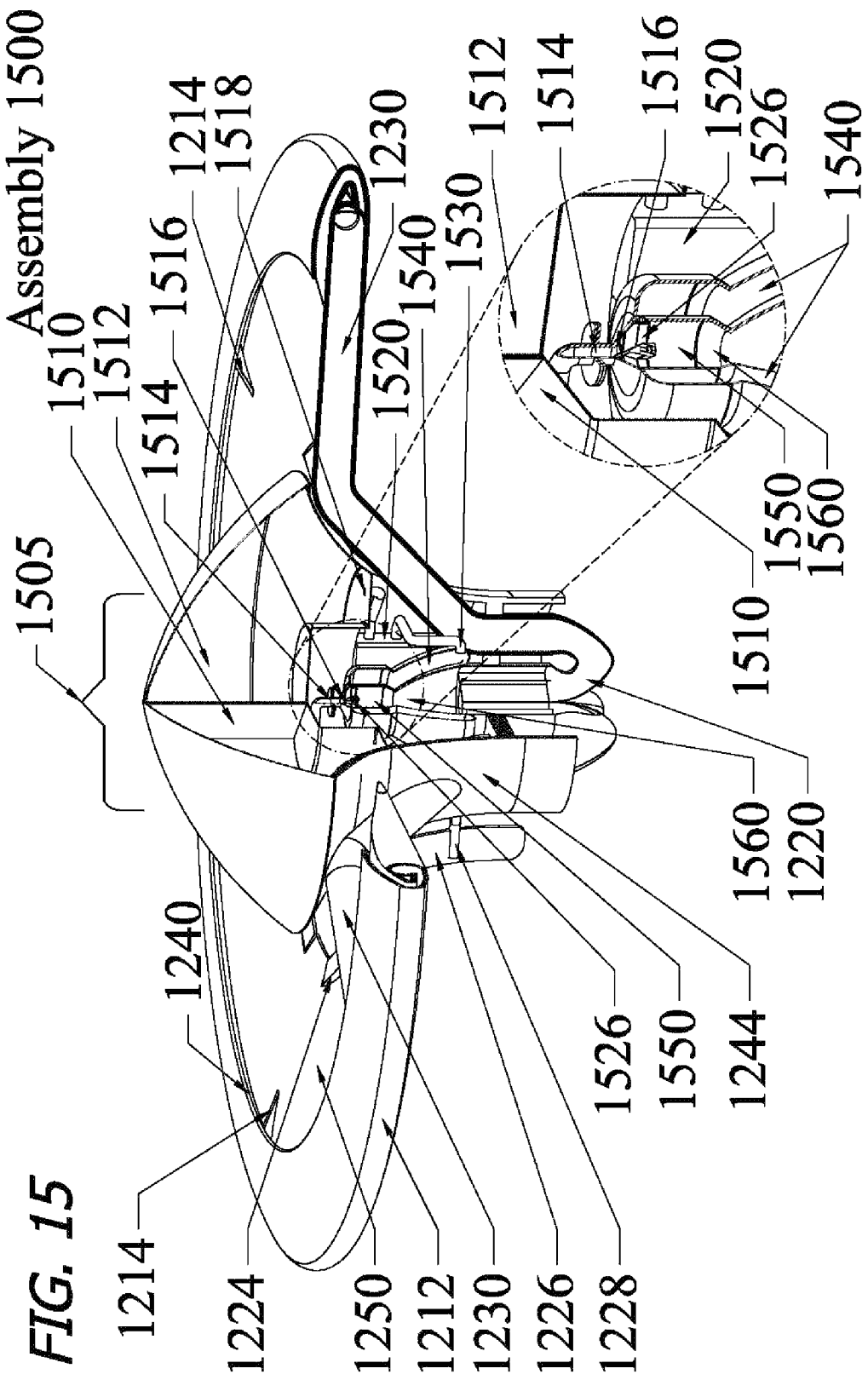
FIG. 15 A cutaway view of a rocket powered version of the toroidal embodiment.

FIG. 15 illustrates a rocket powered flattened toroidal airfoil assembly (1500), a variation of said flattened toroidal airfoil assembly (1200). In addition to comprising the components common to said flattened toroidal airfoil assembly (1200), specifically said flattened toroidal leading edge spar (1212), said toroidal airfoil partitioning bulkhead (1214), said exhaust header (1220), said ailerons (1224), said rotation control fin (1226), said rotation control find drive shaft (1228), said pressurized feed duct (1230), said pressurized fluid escape port (1240), said discharge deflection shroud (1244) and said lifting surface (1250), said rocket powered flattened toroidal airfoil assembly (1500) comprises a rocket engine (1505) which in turn comprises an oxidizer storage tank (1510), a fuel storage tank (1512), an oxidizer feed port (1514), an oxidizer diffusion chamber (1550), a fuel feed suction port (1518), a fuel & oxidizer metering system (1520), a fuel feed diffuser (1526), a fuel feed port (1530), a preheating fuel heat exchanger (1540), a combustion chamber (1550) and an exhaust nozzle (1560). The main function of said fuel & oxidizer metering system (1520) is to maintain an appropriate fuel/oxidizer ratio. Said fuel & oxidizer metering system (1520) meters oxidizer from the oxidizer storage tank (1510) to the oxidizer feed port (1514) where it enters the oxidizer diffusion chamber (1550). Additionally, said fuel & oxidizer metering system (1520) meters fuel from said fuel storage tank (1512) through the fuel feed suction port (1518) and into the fuel feed port (1530) where it is preheated in the fuel heat exchanger (1540) and is forced into the fuel feed diffuser (1526) and combines with the oxidizer from the oxidizer diffusion chamber. (1516) and enters the combustion chamber (1550) where the combined fuel/oxidizer is ignited by the ongoing combustion in the chamber (1550). Said oxidizing fuel then exits the combustion chamber (1550) to the exhaust nozzle (1560) whereby the pressurized fluid flow is maintained. Once the pressurized fluid exits the exhaust nozzle (1560), the principle and sequence of operation of said rocket powered flattened toroidal airfoil assembly (1500), follows the same pattern of said flattened toroidal airfoil assembly (1200).

Said rocket powered flattened toroidal type airfoil assembly (1500) is capable of operation without atmospheric oxygen and will thereby be fully suitable for use in orbital scenarios. An application of said rocket powered flattened toroidal type airfoil assembly (1500), capable of providing an acceleration of at least 32 feet/sec2, and maintaining a velocity of at least 20 feet/sec against the force of gravity, could reach the altitude of the International Space Station—249 miles—in approximately 18 hours, at which point the aircraft could be rotated to a position perpendicular to the curvature of the Earth, and accelerated to orbital velocity—17,150 mph—in under 15 minutes, at which time the engine may be de-energized and the orbital position maintained.

Figure 16:
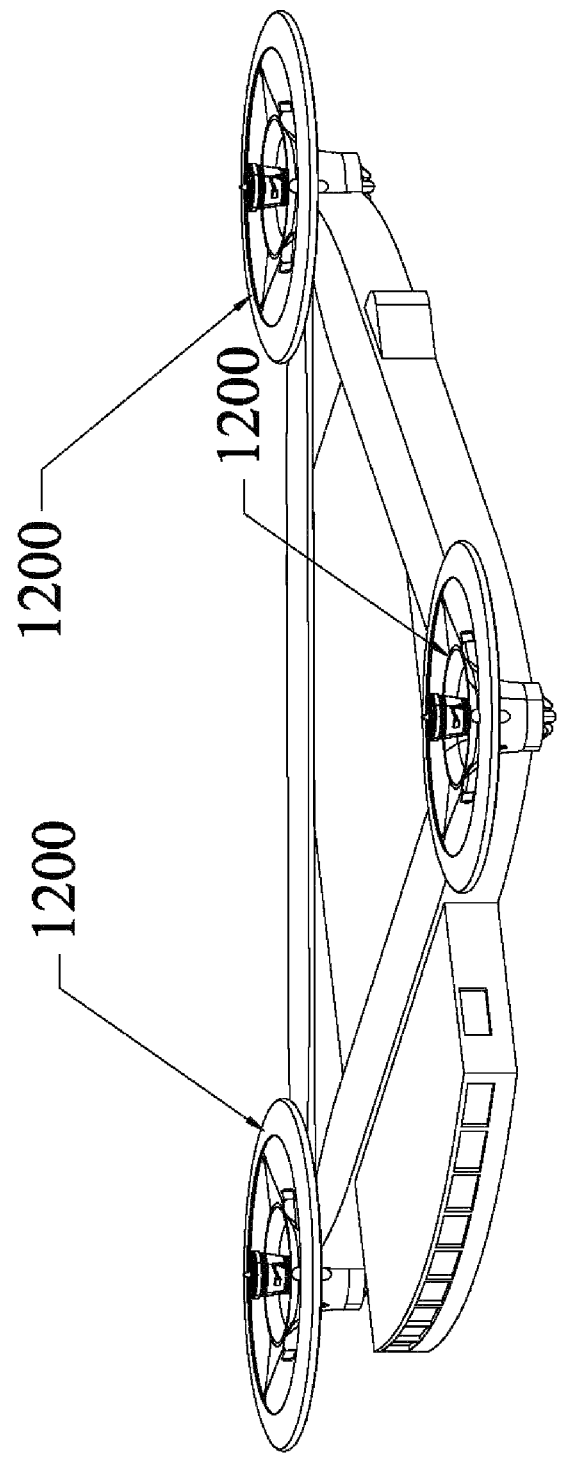
FIG. 16 A conceptual view of a high capacity lifting platform powered by three toroidal embodiments of the present invention.

Said flattened toroidal type airfoil assembly (1200) and said rocket powered flattened toroidal airfoil assembly (1500) can be used in multiple configurations to create lifting platforms with greatly increased capacity. FIG. 16 illustrates a vertical displacement lifting platform (1600) powered by a combination of three flattened toroidal type airfoil assemblies (1200). In said vertical displacement lifting platform (1600), the rotation control fin (1226) of each flattened toroidal type airfoil assembly (1200), should be oriented on the outboard side of its respective flattened toroidal type airfoil assembly (1200) relative to the centerline of the vertical moment of inertia of said vertical displacement lifting platform (1600) to aid in controlling the yaw of the platform. Such combinations of multiple flattened toroidal type airfoil assemblies (1200) could be capable of transferring large loads into orbit.

Figure 17:
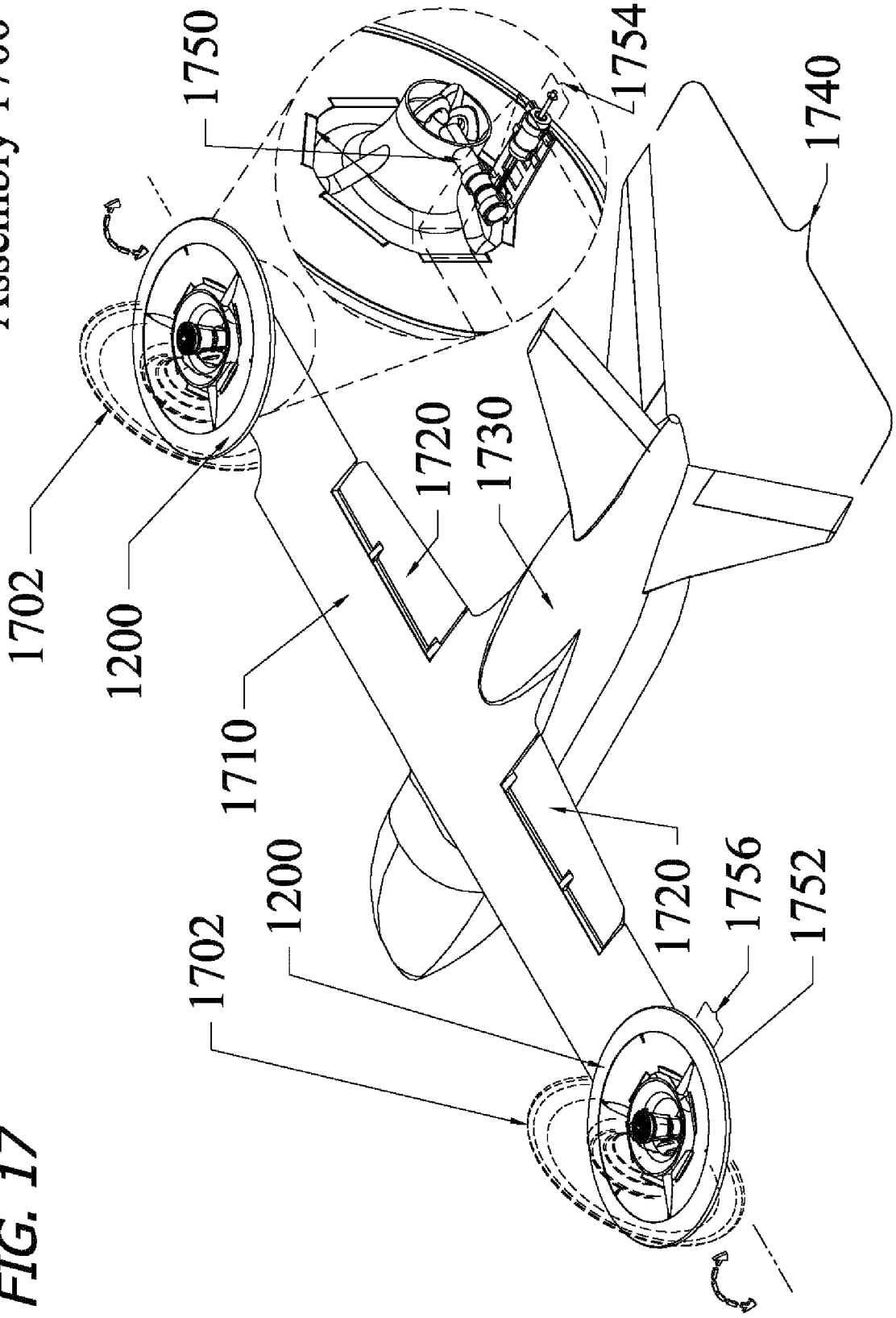
FIG. 17 A conceptual view of a Vertical Take-off & Landing system powered by two, vertical to horizontal positioned, toroidal embodiments of the present invention.

Said flattened toroidal type airfoil assembly (1200) and said rocket powered flattened toroidal airfoil assembly (1500) are both high efficiency lift generating systems that may be also used as pure thrust generating systems. FIG. 17 shows a vertical takeoff & landing (VTOL) assembly (1700) utilizing flattened toroidal type assemblies (1200) as power units. Said vertical takeoff & landing assembly (1700) comprises two forward rotating toroidal type airfoil assemblies (1702) each comprising a flattened toroidal type airfoil assembly (1200) with a right rotation drive assembly (1754) or a left rotation drive assembly (1756) to control the angular orientation of its respective flattened toroidal type airfoil assembly (1200). Said right rotation drive assembly (1754) and said left rotation drive assembly (1756) are both configured similar to said airfoil rotation drive assembly (0650) and control the orientation of said flattened toroidal type airfoil assembly (1200) via a right pivot trunnion (1750) and a left pivot trunnion (1752) in a manner similar to the airfoil rotation control of FIG. 6. Said vertical takeoff & landing assembly (1700) further comprises a fixed wing assembly (1720), forward motion flaps or ailerons (1224), a fuselage (1730), and forward motion tail stabilizers, elevators & rudder (1740) to complete the airframe for flight control.

As will be obvious from the foregoing, said induced lift vectors (0180) are created and maintained without the necessity of forward, horizontal displacement of the airfoil. Additionally, said induced lift vectors (0180) are generated without regard to the configuration of said leading edge spar (0120 & 1212), therefore alterations to or distortions of the shape of said leading edge spar (0120 & 1212) will not have an impact upon said induced lift vectors (0180). Furthermore, the orientation of said pressurized fluid escape port (0185) and the fluid flow escape path (0170) to said lifting surface (0154 & 1250) remains fixed and consistent through all angles of attack of said quasi-rectangular, fixed-wing type airfoil embodiment. Because of the foregoing, the various embodiments will produce lift with high efficiency of fuel consumption, and will not be subject to stall.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An airfoil comprising
a housing comprising
an upper panel;
a lifting surface panel having a lifting surface;
a lower panel;
a first side panel; and
a second side panel;
a pressurized fluid source;
a pivot feed tube to rotate about a first axis, the first axis being closer to a leading edge of the airfoil than a trailing edge of the airfoil;
a pressurized header;
a plurality of partitioning bulkheads;
a plurality of flow normalizing chambers; and
a plurality of pressurized fluid escape ports positioned between the upper panel and the lifting surface panel and aligned along a first direction parallel to the first axis;
wherein pressurized fluid from the pressurized fluid source passes through the pivot feed tube, passes through the pressurized header, and is periodically interrupted and diverted by the plurality of partitioning bulkheads;
wherein a respective portion of the pressurized fluid periodically interrupted and diverted by each of the plurality of partitioning bulkheads passes through a respective flow normalizing chambers of the plurality of flow normalizing chambers, and then exits a respective pressurized fluid escape port of the plurality of pressurized fluid escape ports forming a respective portion of a gaseous fluid flow; and
wherein motive power of the airfoil directly induces the gaseous fluid flow across the lifting surface without requiring a movement of the airfoil through an airspace.

2. The airfoil of claim 1, wherein each of the plurality of flow normalizing chambers is of a helical shape and each of the plurality of flow normalizing chambers is enclosed by a leading edge spar, a respective chamber completion skin and a respective partitioning bulkhead.

3. The airfoil of claim 1, wherein the pivot feed tube rotates about the first axis in a range from minus sixty degrees to thirty degrees.

4. The airfoil of claim 1, wherein the pressurized header extends along the first direction and through an entire length of the airfoil.

5. The airfoil of claim 1, wherein the pivot feed tube is directly attached to an airfoil rotation bearing assembly;
wherein the airfoil rotation bearing assembly is directly attached to a mounting frame of an airfoil rotation drive assembly;
wherein the pivot feed tube is directly attached to an airfoil rotation driver gear;
wherein the airfoil rotation driver gear contacts and directly engages an airfoil rotation driver rack gear operated by an airfoil rotation drive cylinder of the airfoil rotation drive assembly.

6. The airfoil of claim 1, wherein the pressurized fluid source is between a root edge of the airfoil and a fuselage of an aircraft and wherein the pivot feed tube provides both a duct for the pressurized fluid and a structural support for the airfoil that allows an angle of attack of the airfoil to be dynamically adjusted while the airfoil is in operation.

7. An aircraft comprises the airfoil of claim 6 and an other airfoil, wherein the other airfoil is a mirror image of the airfoil with respect to a middle plane of the aircraft and wherein the angle of attack of the airfoil and an other angle of attack of the other airfoil are cooperatively adjusted to control a positive, zero or negative horizontal displacement of the aircraft.

8. An aircraft comprises the airfoil of claim 6 and an other airfoil, wherein the other airfoil is a mirror image of the airfoil with respect to a middle plane of the aircraft and wherein the angle of attack of the airfoil and an other angle of attack of the other airfoil are adjusted independently.

9. The aircraft of claim 8, wherein the angle of attack of the airfoil and the other angle of attack of the other airfoil are differentially adjusted to control a positive, zero or negative roll of the aircraft.

10. The aircraft of claim 8 further comprising means to control a pitch and a yaw of the aircraft when the aircraft is not undergoing a horizontal displacement.

11. The aircraft of claim 10, wherein the means to control the pitch and the yaw of the aircraft is provided by pilot motions augmented by directing a mechanical apparatus or a hydraulic apparatus.

12. The aircraft of claim 10, wherein the means to control the pitch and the yaw of the aircraft is provided by pilot commands augmented by a computer driven, fly-by-wire apparatus incorporating a mechanical apparatus or a hydraulic power control system.

13. The aircraft of claim 8 further comprising means to control a pitch and a yaw of the aircraft when the aircraft is undergoing a predetermined horizontal displacement.

14. The aircraft of claim 13, wherein the means to control the pitch and the yaw of the aircraft is provided by pilot motions augmented by directing a mechanical apparatus or a hydraulic apparatus.

15. The aircraft of claim 13, wherein the means to control the pitch and the yaw of the aircraft is provided by pilot commands augmented by a computer driven, fly-by-wire apparatus incorporating a mechanical apparatus or a hydraulic power control system.

16. The aircraft of claim 8 further comprising a flattened toroidal type airfoil in an empennage assembly of the aircraft, wherein the flattened toroidal type airfoil comprises a toroidal type pressurized header, a plurality of toroidal type flow normalizing chambers and a toroidal type lift generating surface and wherein the toroidal type pressurized header, the plurality of toroidal type flow normalizing chambers and the toroidal type lift generating surface are positioned concentrically about a second axis perpendicular to the first axis.

17. The aircraft of claim 16, wherein a toroidal type pressurized fluid source producing toroidal type pressurized fluid is positioned at a location near the second axis.

18. The aircraft of claim 16, wherein a toroidal type pressurized fluid source producing toroidal type pressurized fluid is connected to the toroidal type pressurized header by an array of ducts articulated about the second axis and wherein the array of ducts are divided into three or more segments.

19. The aircraft of claim 18, wherein ailerons are provided within said three or more segments to control a pitch and a yaw of the aircraft.

20. The aircraft of claim 19, wherein a deflecting shroud is incorporated around the second axis so that the toroidal type pressurized fluid moving across the lift generating surface of the flattened toroidal type airfoil impacts the deflecting shroud so as to generate additional lift.

21. The aircraft of claim 20, wherein a control fin is incorporated within a stream of fluid exhausting downward from the deflecting shroud to control a rotation of the aircraft.

22. The aircraft of claim 21, wherein pilot motions augmented by directing a mechanical apparatus or a hydraulic apparatus are used to control the pitch, the yaw, and the rotation of the aircraft.

23. The aircraft of claim 21, wherein pilot commands augmented by a computer driven, fly-by-wire apparatus incorporating a mechanical apparatus or a hydraulic power control systems are used to control the pitch, the yaw, and the rotation of the aircraft.

24. The aircraft of claim 20 further comprising additional two or more flattened toroidal type airfoils in a front portion of the aircraft to increase capacity and efficiency for vertical displacement of loads.

25. The aircraft of claim 24, wherein each of the additional two or more flattened toroidal type airfoils comprises a respective trunnion and wherein the respective trunnion allows each of the additional two or more flattened toroidal type airfoils to rotate about a third axis parallel to the first axis.

26. The aircraft of claim 20, wherein the toroidal type pressurized fluid source utilizes fuel and oxidizing agents for operations outside of oxygen rich atmospheres.

* * * * *